(12) United States Patent
Wang

(10) Patent No.: US 12,011,908 B2
(45) Date of Patent: Jun. 18, 2024

(54) STRETCHABLE DISPLAY PANEL AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Wenqiang Wang, Wuhan (CN)

(73) Assignee: WUHAN CHINA STAR OPTOELECTORNICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 559 days.

(21) Appl. No.: 17/283,011

(22) PCT Filed: Mar. 19, 2021

(86) PCT No.: PCT/CN2021/081857
§ 371 (c)(1),
(2) Date: Apr. 5, 2021

(87) PCT Pub. No.: WO2022/151583
PCT Pub. Date: Jul. 21, 2022

(65) Prior Publication Data
US 2023/0109049 A1    Apr. 6, 2023

(30) Foreign Application Priority Data

Jan. 12, 2021   (CN) .......................... 202110035054.1

(51) Int. Cl.
| B32B 3/00 | (2006.01) |
| B32B 3/26 | (2006.01) |
| B32B 3/30 | (2006.01) |
| G06F 1/16 | (2006.01) |
| B32B 27/28 | (2006.01) |

(52) U.S. Cl.
CPC ............... B32B 3/266 (2013.01); B32B 3/30 (2013.01); G06F 1/1652 (2013.01);
(Continued)

(58) Field of Classification Search
CPC ......... G06F 1/1652; B32B 3/266; B32B 3/30; B32B 27/281; B32B 2307/51;
(Continued)

(56) References Cited

U.S. PATENT DOCUMENTS

| 2016/0217551 A1 | 7/2016 | Kim et al. |
| 2017/0352692 A1 | 12/2017 | Lee et al. |

(Continued)

FOREIGN PATENT DOCUMENTS

| CN | 109599402 A | 4/2019 |
| CN | 110444575 A | 11/2019 |

(Continued)

*Primary Examiner* — Zhengfu J Feng
(74) *Attorney, Agent, or Firm* — The Roy Gross Law Firm, LLC; Roy Gross

(57) ABSTRACT

A stretchable display panel and a display device are disclosed. The stretchable display device includes a display area and a wiring area. Each of bridge structures in a transition display area gradually increases in width in a direction from a middle display area to the wiring area. A plurality of first openings are defined on a side of the transition display area adjacent to the wiring area. Each of the first openings has opposite ends located within a boundary area defined by a connecting line connecting centers of adjacent island structures corresponding to the opposite ends of the first opening. In this manner, a hollow ratio of the transition display area close to the wiring area can be reduced, and risk of breakage of lines in the transition display area can be lowered.

20 Claims, 5 Drawing Sheets

(52) U.S. Cl.
CPC ......... *B32B 27/281* (2013.01); *B32B 2307/51* (2013.01); *B32B 2307/7244* (2013.01); *B32B 2307/7246* (2013.01); *B32B 2457/20* (2013.01)

(58) Field of Classification Search
CPC .... B32B 2307/7244; B32B 2307/7246; B32B 2457/20; Y02E 10/549; G09F 9/301; H10K 59/10
USPC .......................................................... 361/807
See application file for complete search history.

(56) References Cited

U.S. PATENT DOCUMENTS

| | | | |
|---|---|---|---|
| 2018/0052493 A1* | 2/2018 | Hong | H10K 59/40 |
| 2018/0299927 A1 | 10/2018 | Chen | |
| 2019/0258297 A1* | 8/2019 | Choi | G06F 1/1652 |
| 2020/0111978 A1* | 4/2020 | Kim | H01L 27/1218 |
| 2020/0168824 A1* | 5/2020 | Park | H10K 77/111 |
| 2022/0359477 A1* | 11/2022 | Hu | H10K 59/18 |
| 2023/0075199 A1* | 3/2023 | Tian | H10K 59/19 |

FOREIGN PATENT DOCUMENTS

| | | |
|---|---|---|
| CN | 110993679 A | 4/2020 |
| CN | 111244133 A | 6/2020 |
| CN | 111326068 A | 6/2020 |
| CN | 111862815 A | 10/2020 |
| CN | 112002234 A | 11/2020 |
| KR | 2020042140 A | 4/2020 |

* cited by examiner

STRETCHABLE DISPLAY PANEL AND DISPLAY DEVICE

CROSS REFERENCE TO RELATED APPLICATIONS

This application is a National Phase of PCT Patent Application No. PCT/CN2021/081857 having International filing date of Mar. 19, 2021, which claims the benefit of priority of Chinese Application No. 202110035054.1 filed Jan. 12, 2021. The contents of the above applications are all incorporated by reference as if fully set forth herein in their entirety.

BACKGROUND OF INVENTION

1. Field of Invention

The present invention relates to a technical field of displays, and particularly to, a stretchable display panel and a display device.

2. Related Art

With development of flexible organic-light emitting diode (OLED) display technologies, consumer markets for foldable and reel-type display terminal products are growing to be mature. The innovation of foldable display technologies has made widescreen design of mobile phones, tablets, and laptops more diverse, and display functions and effects more sophisticated than liquid crystal display (LCD) technologies. On the basis of the flexible OLED display technologies, stretchable display technologies will be a key research direction of next generation display technologies.

The essence of the stretchable display technologies is to realize flexibility of screens themselves. Through flexible design of display backplanes, that is, the use of patterned processes, backplane materials are hollowed out, so as to change mechanical properties of the materials themselves, making display panels stretchable and deformable in any direction based on an original size, thereby achieving stretchable and expandable displaying. In doing so, diverse designs of display shapes can be achieved to adapt to multiple occasions and meet requirements of the environment. The stretchable display technologies have broad application prospects in the fields of wearable, flexible medical equipment, and vehicle display technologies.

However, realization of stretchable display technologies mainly depends on mechanical properties of display substrates. Module materials will inevitably be subjected to external forces during stretching, which will cause different degrees of local deformation inside display panels, resulting in display failure. Particularly in transition display areas close to wiring areas of display areas, when display backplanes of hollow-out design configured with island bridge structures are in a stretched state, the island bridge structures are more prone to fracture due to local stress, thereby causing various metal traces in the areas to break, and giving rise to ineffectiveness of the display panels.

Accordingly, there is a problem with current stretchable display panels that traces in edges of display areas are prone to breakage. Therefore, it is imperative to provide a stretchable display panel and a display device to overcome the problem.

SUMMARY OF INVENTION

The embodiments of the present application provide a stretchable display panel and a display device to solve a problem with current stretchable display panels that traces in edges of display areas are prone to breakage.

An embodiment of the present application provides a stretchable display panel, comprising a display area and a wiring area surrounding the display area, and the display area comprising a middle display area and a transition display area defined between the middle display area and the wiring area, wherein the stretchable display panel further comprises a plurality of island structures arranged in an array in the display area, and at least a pixel unit disposed above each of the island structures; and a plurality of bridge structures each connecting adjacent two of the island structures, and a plurality of lines disposed above each of the bridge structures; wherein each of the bridge structures in the transition display area gradually increases in width in a direction from the middle display area to the wiring area, and a plurality of first openings are defined on a side of the transition display area adjacent to the wiring area, wherein each of the first openings has opposite ends located within a boundary area defined by a connecting line connecting centers of adjacent two of the island structures corresponding to the opposite ends of the first opening.

According to one embodiment of the present application, a plurality of second openings are defined on a side of the transition display area adjacent to the middle display area, and each of the second openings has opposite ends extending beyond a boundary area defined by a connecting line connecting centers of adjacent two of the island structures corresponding to the opposite ends of the second opening.

According to one embodiment of the present application, the first opening has an area smaller than an area of the second area.

According to one embodiment of the present application, each of the second openings gradually decreases in area in the direction from the middle display area to the wiring area.

According to one embodiment of the present application, each of the second openings comprises a plane pattern having an axisymmetric shape of a symmetry axis, and a plurality of protrusions are configured on opposite two sides of the symmetry axis of the plane pattern and protrude outwardly in different directions from the symmetry axis, wherein the protrusions of each of the second openings gradually decrease in number in the direction from the middle display area to the wiring area.

According to one embodiment of the present application, top portions of the protrusions located at two ends of each of the opposite sides of the symmetry axis are spaced at a distance from the symmetry axis gradually decreasing in the direction from the middle display area to the wiring area.

According to one embodiment of the present application, a ratio of a width of the transition display area to a width of the display area ranges from 3.9% to 4.8%.

According to one embodiment of the present application, the transition display area comprises a first sub-transition display area, a second sub-transition display area, and a third sub-transition display area that sequentially surround the middle display area, wherein widths of the bridge structures in the first sub-transition display area, widths of the bridge structures in the second sub-transition display area, and widths of the bridge structures in the third sub-transition display area gradually increase.

According to one embodiment of the present application, a ratio of a width of the first sub-transition display area to a width of the second sub-transition display area and a width of the third sub-transition display area is 2:2:1.

According to one embodiment of the present application, a ratio of the width of the bridge structure in the second sub-transition display area to the width of the bridge structures in the first sub-transition display area is between 1.2 and 1.5, and a ratio of the width of the bridge structure in the third sub-transition display area to the width of the bridge structure in the second sub-transition display area is between 1.2 and 1.5.

According to one embodiment of the present application, the first opening includes first parts defined at two ends of the first opening, and a second part interconnecting the first parts, wherein each of the first parts is curved, and the second part is straight.

According to one embodiment of the present application, adjacent two of the first openings are arranged in such a way that one of the two first openings is provided in an extending direction perpendicular to the other one of the two first openings.

According to one embodiment of the present application, the transition display area is a surrounding area defined by a plurality of sides connected end to end in turn, and comprises a middle region located at a middle of each of the sides, and a corner region located at where the sides are connected end to end, wherein the first openings are at least defined in the middle region.

According to one embodiment of the present application, a plurality of the first openings are arranged from the middle region to the corner region, wherein the first openings in a unit area decrease in number in a direction from the middle region to the corner region, and the second openings in the unit area increase in number in the direction from the middle region to the corner region.

According to one embodiment of the present application, a spacing between centers of any adjacent two of the island structures is same.

According to one embodiment of the present application, the stretchable display panel comprises a flexible substrate and a plurality of inorganic layers and organic layers stacked on the flexible substrate, and the first openings pass through the inorganic layers, the organic layers, and the flexible substrate.

An embodiment of the present application further provides a display device, comprising a stretchable display panel, and the stretchable display panel comprising a display area and a wiring area surrounding the display area, the display area comprising a middle display area and a transition display area defined between the middle display area and the wiring area, wherein the stretchable display panel further comprises a plurality of island structures arranged in an array in the display area, and at least a pixel unit disposed above each of the island structures; and a plurality of bridge structures each connecting adjacent two of the island structures, and a plurality of lines disposed above each of the bridge structures; wherein each of the bridge structures in the transition display area gradually increases in width in a direction from the middle display area to the wiring area, and a plurality of first openings are defined on a side of the transition display area adjacent to the wiring area, wherein each of the first openings has opposite ends located within a boundary area defined by a connecting line connecting centers of adjacent two of the island structures corresponding to the opposite ends of the first opening.

According to one embodiment of the present application, a plurality of second openings are defined on a side of the transition display area adjacent to the middle display area, and each of the second openings has opposite ends extending beyond a boundary area defined by a connecting line connecting centers of adjacent two of the island structures corresponding to the opposite ends of the second opening.

According to one embodiment of the present application, the first opening has an area smaller than an area of the second area.

According to one embodiment of the present application, each of the second openings gradually decreases in area in the direction from the middle display area to the wiring area.

The present application has advantageous effects as follows: embodiments of the present application provide a stretchable display panel and a display device. The stretchable display panel includes a display area and a wiring area surrounding the display area. The display area includes a middle display area and a transition display area defined between the middle display area and the wiring area. The stretchable display panel further includes a plurality of island structures and bridge structures arranged in an array in the display area. At least a pixel unit is disposed above each of the island structures, each of the bridge structures connects adjacent two of the island structures, and a plurality of lines are disposed above each of the bridge structures. Each of the bridge structures in the transition display area gradually increases in width in a direction from the middle display area to the wiring area. Since the tensile strength of the bridge structure is proportional to the width of the bridge structure, the tensile strength of the bridge structures in the transition display area gradually increase in the direction from the middle display area to the wiring area. In this manner, it not only ensures stretchability of the display area, but also increase tensile strength and tensile resistance of the transition display area, as well as improving uniformity of stress on each part of the transition display area. A plurality of first openings are defined on a side of the transition display area adjacent to the wiring area. Each of the first openings has opposite ends located within a boundary area defined by a connecting line connecting centers of adjacent two of the island structures corresponding to the opposite ends of the first opening. In this manner, the width of each of the bridge structures in the transition display area close to the wiring area is further increased, and a hollow ratio of this area is reduced, thereby further increasing local rigidity of the transition display area close to the wiring area and tensile strength of the bridge structure in the same area, so that a stress concentration factor of the above-mentioned area can be reduced, thereby lowering risk of breakage of the lines in the transition display area close to the wiring area, solving a problem with conventional stretchable display panels that traces in edges of display areas are prone to breakage, and improving the tensile resistance and service life of the stretchable display panel.

BRIEF DESCRIPTION OF DRAWINGS

To better illustrate embodiments or technical solutions in the prior art, a brief description of the drawings used in the embodiments or the prior art description will be given below. Obviously, the accompanying drawings in the following description merely show some embodiments of the present invention, and a person skilled in the art may still derive other drawings from these accompanying drawings without creative efforts.

DESCRIPTION OF PREFERRED EMBODIMENTS

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

The present disclosure will be further described below in conjunction with the drawings and specific embodiments.

Figure 1:
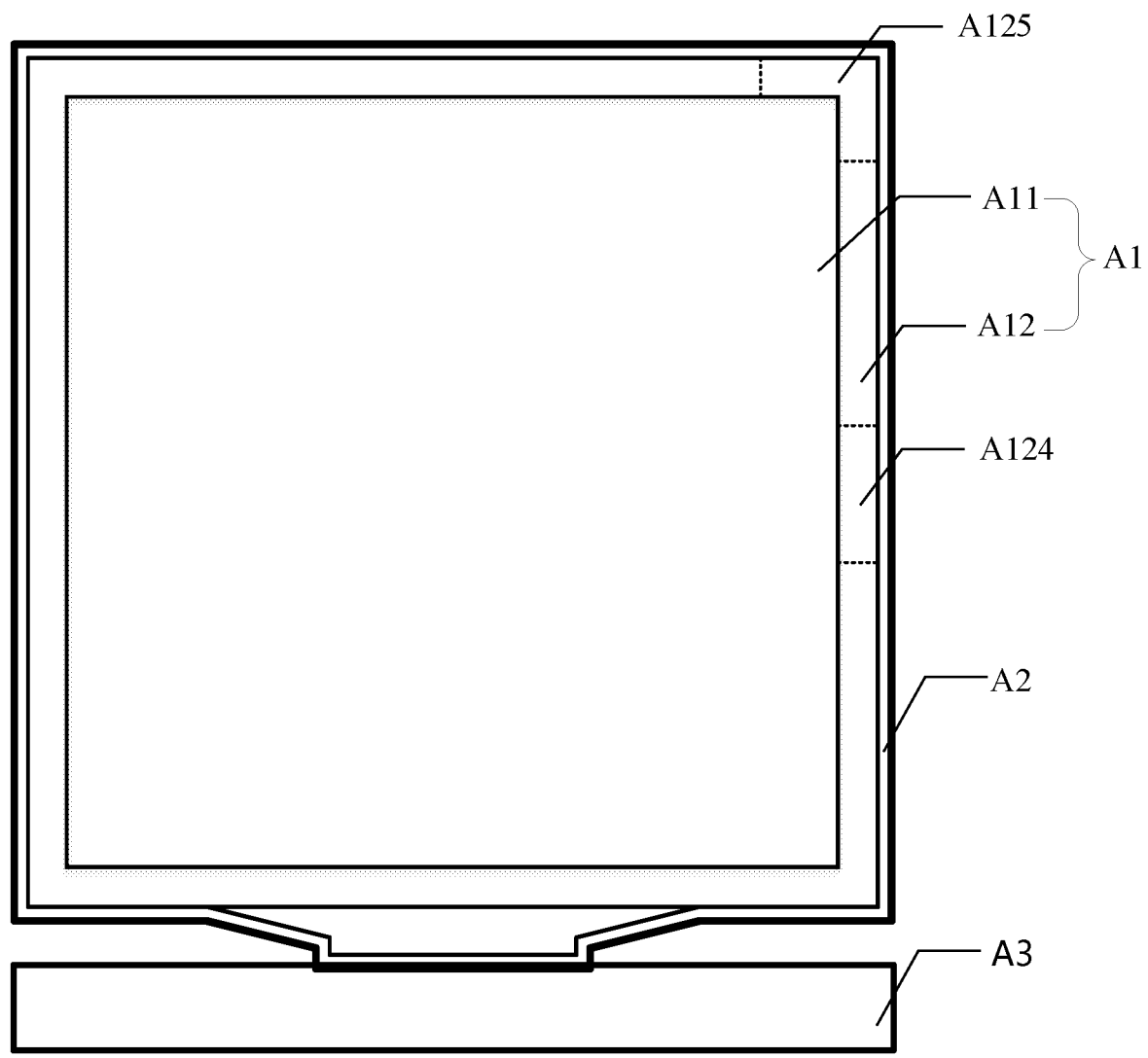
FIG. 1 is a schematic structural view of a stretchable display panel provided by an embodiment of the present application.
Figure 2:
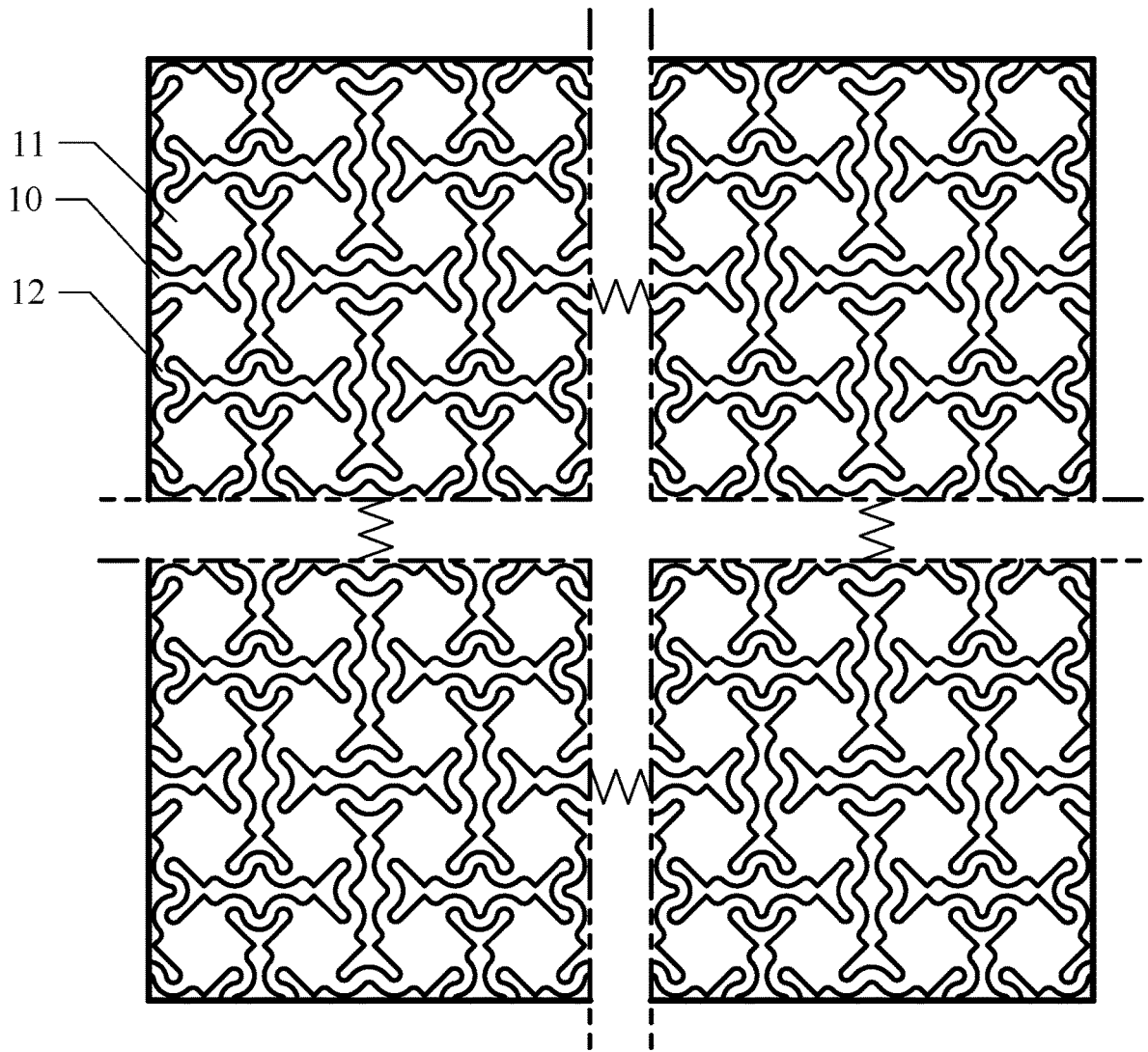
FIG. 2 is a schematic structural view of a middle display area provided by an embodiment of the present application.

An embodiment of the present application provides a stretchable display panel. The following is a detailed description in conjunction with FIGS. 1 and 2. Please refer to FIGS. 1 and 2. FIG. 1 is a schematic structural view of a stretchable display panel provided by an embodiment of the present application, and FIG. 2 is a schematic structural view of a middle display area provided by the embodiment of the present application. The stretchable display panel includes a display area A1, a wiring area A2, a plurality of island structures 11 and a plurality of bridge structures 12. The plurality of island structures 11 are arranged in an array in the display area A1, and at least a pixel unit is disposed above each of the island structures 11. Each of the bridge structures 12 connects adjacent two of the island structures 11, and a plurality of lines are disposed above each of the bridge structures 12.

In one embodiment of the present application, with reference to FIGS. 1 and 2, the display area A1 as a whole is square in shape and comprises a plurality of hollow openings 10. The openings 10 divide the plurality of independent and rigid island structures 11 and the plurality of bridge structures 12. Each of the island structures 11 is square in shape and is disposed at 45° with respect to a horizontal direction and is arranged in a matrix pattern on a plane where the display area A1 is on. A spacing between centers of any adjacent two of the island structures 11 is same, and four sides of each of the island structures 11 are connected with a corresponding one of the bridge structures 12, respectively.

It should be noted that each of the island structures 11 is a collection of pixel functions. Each of the island structures 11 is provided with a laminated structure including a driving circuit layer for driving a display device to emit light and a light-emitting device layer for light emitting. The driving circuit layer includes at least a thin-film transistor, and the light-emitting device layer includes at least a light-emitting diode. In practical applications, the island structures can be designed with other shapes and film structures according to actual needs, and are not limited to the above-mentioned square shape, may also be rectangular, circular, elliptical, diamond, other polygons, etc., and may be disposed at other angles with respect to the horizontal direction, such as 0°, etc., but is not limited thereto.

The wiring area A2 is configured for arrangement of various metal signal lines to transmit signals to the display area A1. The various metal signal lines are led out from the display area A1 and are collected in a bonding area A3 through the wiring area A2. A plurality of bonding pads are disposed in the bonding area A3 and are configured to bond a chip-on-film, a flexible circuit board, or a driving circuit chip.

In one embodiment of the present application, the stretchable display panel can be freely returned to its original state when tensile elongation is not less than 5%. Each of the light-emitting device layers in the island structure 11 can be displayed normally and independently, and a pixel density is not lower than 141 pixels-per-inch (PPI). In some other embodiments, the pixel density of the stretchable display panel may also be lower than 141 PPI. A spacing between centers of any adjacent two of the island structures 11 is varied according to the pixel density. In practical applications, the pixel density of the stretchable display panel and the spacing between the centers of any adjacent two of the island structures 11 may be set according to the actual situation, and there is no limitation here.

Please refer to FIG. 1. In one embodiment of the present application, the display area A1 includes a middle display area A11 and a transition display area A12 defined between the middle display area A11 and the wiring area A2.

It should be noted that FIG. 1 is only to illustrate structural relationship between the middle display area A11, the transition display area A12, and the wiring area A2 of the stretchable display panel provided by an embodiment of the present application. Widths of the middle display area A11, the transition display area A12, and the wiring area A2 in the stretchable display panel shown in FIG. 1 do not represent the actual widths of the middle display area A11 and the transition display area A12 of the stretchable display panel in practical applications.

According to a ball-headed stretching simulation experiment of the stretchable display panel, as the stretchable display panel is in the process of deformation, the tensile stress is transferred from the middle display area A11 to the transition display area A12 of the stretchable display panel. When the stretchable display panel is stretched and deformed by 5%, the transition display area A12 exhibits a crest phenomenon, that is, the transition display area A12 is a stress concentration area.

Figure 3:
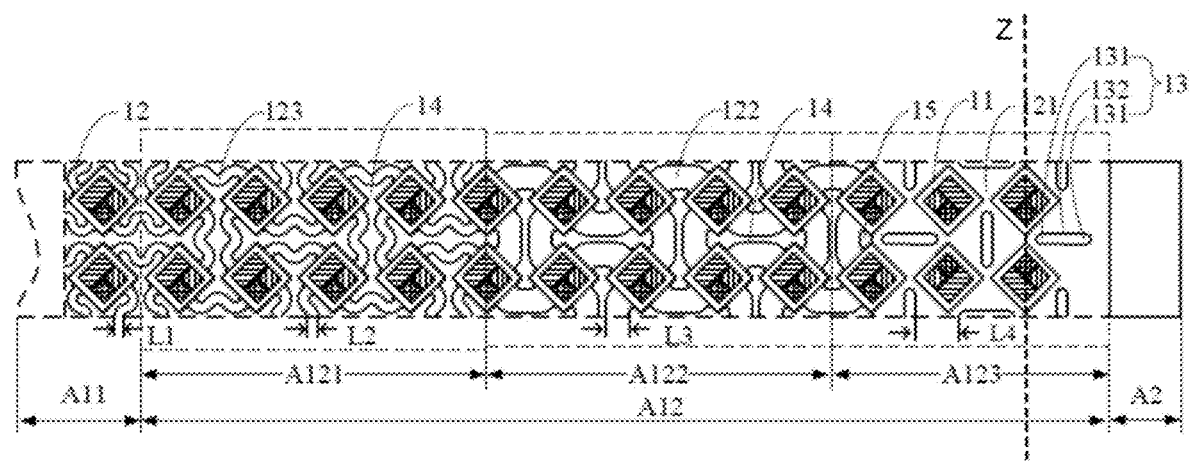
FIG. 3 is a schematic structural view of a transition display provided by an embodiment of the present application.

Please refer to FIG. 3, which is a schematic structural view of a transition display provided by an embodiment of the present application. Each of the bridge structures 12 in the transition display area A12 gradually increases in width in a direction from the middle display area A11 to the wiring area A2. The tensile strength of the bridge structure 12 is proportional to the width of the bridge structure 12, so that the tensile strength of the bridge structure 12 in the transition display area A12 can be gradually increased in the direction from the middle display area A11 to the wiring area A2. In this manner, it not only ensures that the overall tensile performance of the display area A1 is not adversely affected but also reduces a stress concentration factor of the transition display area A12, thereby reducing risk of breakage of traces in the transition display area A12 due to stress concentration.

In one embodiment of the present application, a plurality of first openings 13 are defined on a side of the transition display area A12 adjacent to the wiring area A2. Each of the first openings 13 has opposite ends located within a boundary area defined by a connecting line z connecting centers of adjacent two of the island structures 11 corresponding to the opposite ends of the first opening 13.

Please refer to FIG. 3. The bridge structures 12 include a plurality of first bridge structures 121. The island structures 11 and the first bridge structures 121 located in a same area are separated by the first openings 13. One of the first openings 13 is provided among four of the island structures 11 arranged in a matrix, and a plurality of the first openings 13 are provided between the island structures 11 located at peripheral sides of the area close to the wiring area A2. The island structures 11 separated by the first openings 13 are configured with peripheral sides in no contact with hollow structures, and the island structures 11 located in the middle display area A11 and a side of the transition display area A12 adjacent to the middle display area A11 are configured with peripheral sides in contact with hollow structures. A distance between two of the first openings 13 is a width of each of the first bridge structure 121. By setting opposite ends of the first opening 13 located within the boundary area defined by the connecting line connecting centers of adjacent two of the island structures 11 corresponding to the opposite ends of the first opening 13, a length and an area of the first opening 13 can be reduced, the width of the first bridge structure 121 separated by the first openings 13 can be increased, and a hollow ratio of the transition display area A12 close to the wiring area A2 can be reduced, so that rigidity of the aforementioned area and tensile strength of the first bridge structure 121 can be improved, thereby reducing local stress on the side of the transition display area A12 close to the wiring area A2.

In one embodiment of the present application, a plurality of second openings 14 are defined on a side of the transition display area A12 adjacent to the middle display area A11, and each of the second openings 14 has opposite ends extending beyond a boundary area defined by the connecting line z connecting centers of adjacent two of the island structures 11 corresponding to the opposite ends of the second opening 14.

Please refer to FIG. 3. One of the second openings 14 is provided among every four of the island structures 11 arranged in a matrix on a side of the transition display area A12 adjacent to the middle display area A11. Opposite ends of the second opening 14 extend beyond the boundary area defined by the connecting line connecting centers of adjacent two of the island structures 11 corresponding to the opposite ends of the second opening 14. Since any adjacent two of the island structures 11 are spaced apart from each other at a same distance, the bridge structure separated by any adjacent two of the second openings 14 has a width less than a width of the first bridge structure 121 separated by adjacent two of the first openings 13. Therefore, tensile strength of the first bridge structure 121 located in the transition display area A12 close to the wiring area A2 is greater than tensile strength of the bridge structure 12 away from the wiring area A2.

In one embodiment of the present application, the first opening 13 has an area smaller than an area of the second opening 14. The pixel density of each area in the transition display area A12 is the same, and number of openings per unit area of each area is also the same. An area of each of the first openings 13 in the transition display area A12 close to the wiring area A2 is smaller than an area of each of the second openings 14 in the transition display area A12 close to the middle display area A11, so that a hollow ratio on the side of the transition display area A12 close to the wiring area A2 can be less than a hollow ratio on the side of the transition display area A12 close to the middle display area A11. In this manner, rigidity of the transition display area A12 close to the wiring area A2 is greater than rigidity of the transition display area A12 close to the middle display area A11, thereby reducing a stress concentration factor of the transition display area A12 close to the wiring area A2, and avoiding stress concentration in such area.

Further, each of the second openings 14 gradually decreases in area in the direction from the middle display area A11 to the wiring area A2.

In one embodiment of the present application, the transition display area A12 includes a first sub-transition display area A121, a second sub-transition display area A122, and a third sub-transition display area A123 that sequentially surround the middle display area A11. The second openings 14 are distributed in the first sub-transition display area A121, the second sub-transition display area A122, and part of the third sub-transition display area A123 close to the middle display area A11. The first openings 13 are distributed in part of the third sub-transition display area A123 close to the wiring area A2. Each of the second openings 14 in the first sub-transition display area A121 has an area larger than an area of the second opening 14 in the second sub-transition display area A122. An area of the second opening 14 in the third sub-transition display area A123 is the same as the area of the second opening 14 in the second sub-transition display area A122, so that the hollow ratio of the transition display area A12 can be gradually increased in the direction from the middle display area A11 to the wiring area A2. Rigidity of the transition display area A12 shows an increasing trend with a decrease of the hollow ratio, so as to make the stress dispersion of each area in the transition display area A12 uniform, thereby avoiding stress concentration in the transition display area A12.

Further, each of the second openings 14 located in a same sub-transition display area has a same area. In one embodiment of the present application, each of the second openings 14 in the first sub-transition display A121 has a same area, and each of the second openings 14 in the second sub-transition display A122 also has a same area. In another embodiment, an area of the second opening 14 located in the same sub-transition display area can also show a decreasing trend in the direction from the middle display area A11 to the wiring area A2, so that each of the sub-transition display areas gradually increases in rigidity in the direction from the middle display area A11 to the wiring area A2, thereby reducing a stress concentration factor of each of the sub-transition display areas in the transition display area A12.

In one embodiment of the present application, each of the second openings 14 includes a plane pattern having an axisymmetric shape of a symmetry axis. A plurality of protrusions are configured on opposite two sides of the symmetry axis of the plane pattern and protrude outwardly in different directions from the symmetry axis, wherein the protrusions of each of the second openings 14 gradually decrease in number in the direction from the middle display area A11 to the wiring area A2.

Please refer to FIG. 3. The plane pattern of the second opening 14 is strip-like in shape. The opposite two sides of the symmetry axis of the plane pattern include a plurality of protrusions protrude outwardly along a direction perpendicular to the symmetry axis. Any adjacent two of the second openings 14 are arranged in such a way that one of the two second openings 14 is provided in an extending direction perpendicular to the other one of the two second openings 14, wherein one end of one of the second openings 14 is pointed at a middle part of a side of the other one of the second openings 14, so that a bridge structure is separated by and defined between the two second openings 14. The protrusions of the sides of the adjacent two of the second openings 14 collectively form curve portions or arc chamfers of the bridge structure 12. The more protrusions on the side of the second opening 14 are, the more curved portions of the bridge structure 12 formed by the second openings 14, the tensile performance of the corresponding bridge structure 12 is also better.

Figure 4:
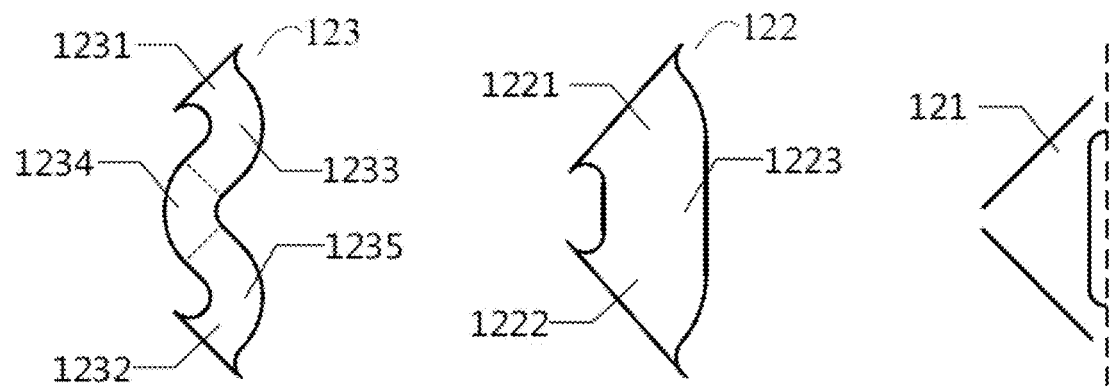
FIG. 4 is a schematic view showing a bridge structure in each of sub-transition display areas provided by an embodiment of the present application.

Specifically, please refer to FIGS. 3 and 4. FIG. 4 is a schematic view showing a bridge structure in each of the sub-transition display areas provided by an embodiment of the present application. The bridge structure 12 includes a second bridge structure 122 and a third bridge structure 123. The second opening 14 located in the first sub-transition display area A121 has five protrusions on both sides of the second opening 14, respectively, wherein three of the five protrusions are provided between adjacent two of the island structures 11 located on a same side of the second opening 14, and the other two protrusions are provided on opposite two ends of the second opening 14. Three protrusions on the same side and located between two adjacent island structures 11 and two protrusions at the ends of an adjacent second opening 14 collectively form the third bridge structure 123 including a first end 1231, a second end 1232, and a first bent portion 1233, a second bent portion 1234, and a third bent portion 1235 located between the first end 1231 and the second end 1232. The first end 1231 and the second end 1232 are respectively connected to two adjacent island structures 11, and an arc-shaped chamfer is formed at the junction.

Opposite sides of the second opening 14 located in the second sub-transition display area A122 include four protrusions, respectively, wherein two of the four protrusions are arranged between two adjacent island structures 11 on a same side of the second opening 14, a side segment between the two protrusions is straight, and the other two protrusions are located at opposite ends of the second opening 14. The two protrusions at two ends of the straight side segment and two protrusions provided at one end of an adjacent second opening 14 collectively form the second bridge structure 122 including a first end 1221, a second end 1222, and a linear bridge structure 1223 between the first end 1221 and the second end 1222. The first end 1221 and the second end 1222 are respectively connected with two adjacent island structures 11, and an arc-shaped chamfer is formed at the junction.

It should be noted that the more the number of curved portions of the bridge structure 12 is, the greater the degree of bending is, and the stronger the tensile performance of the bridge structure 12 is. The third bridge structure 123 includes three curved portions, which are the same as a number of curved portions of the bridge structure 12 located in the middle display area A11, so as to ensure the tensile performance of the transition display area A12 close to the middle display area A11. The second bridge structure 122 does not have a curved portion, only an arc-shaped chamfer, so the tensile performance of the second bridge structure 122 is less than that of the third bridge structure 123, but its tensile strength is greater than that of the third bridge structure 123. In this manner, it not only ensures a certain degree of the tensile performance of the second sub-transition area A122 but also increases local rigidity of that area, thereby reducing a stress concentration factor of that area.

Further, top portions of the protrusions located at two ends of each of the opposite sides of the symmetry axis are spaced at a distance from the symmetry axis gradually decreasing in the direction from the middle display area A11 to the wiring area A2.

Please refer to FIGS. 3 and 4. In one embodiment of the application, top portions of the protrusions located at two ends of a side of the second opening 14 in the first sub-transition area A121 are spaced at a distance from the symmetry axis, wherein the distance is greater than a distance between top portions of the protrusions located at two ends of each of the opposite sides of the second opening 14 in the second sub-transition area A122. The distance between the top portions of the protrusions and the symmetry axis of the second opening 14 is proportional to a curvature of each of the curved portions and the arc-shaped chamfer of the third bridge structure 123. The greater the distance between the top portion of the protrusion and the symmetry axis is, the greater the curvature of the curved portion and the arc-shaped chamfer of the third bridge structure 123 is, and the greater the tensile performance of the third bridge structure 123 is, the less the tensile strength is.

In one embodiment of the present application, the curvature of each of the curved portions of the bridge structure 12 in the middle display area A11 and the curvature of each of the arc-shaped chamfers at both ends of the bridge structure 12 are greater than curvatures of corresponding curved portions and arc-shaped chamfers of the third bridge structures 123, respectively. The curvatures of the arc-shaped chamfers at the two ends of the third bridge structure 123 are greater than curvatures of corresponding arc-shaped chamfers of the second bridge structure 122.

A ratio of a width of the transition display area A12 to a width of the display area A1 ranges from 3.9% to 4.8%. Limiting the ratio of the width of the transition display area A12 to the width of the display area A1 between 3.9% and 4.8% can ensure that as the stretchable display panel is stretched and deformed, most of the deformation is borne by the middle display area A11, and further reduce a stress concentration factor of the transition display area A12.

Specifically, a ratio of a width of the transition display area A12 to a width of the display area A1 is 3.9%. The width of the display area A1 is 125 millimeters (mm), and the width of the transition display area A12 is 4.9 mm. In another embodiment, a ratio of a width of the transition display area A12 to a width of the display area A1 may be 4.2%, 4.5%, or 4.8%. The width of the display area A1 and the ratio of the width of the transition display area A12 to the width of the display area A1 can be varied according to actual applications, and there is no limitation here.

In one embodiment of the present application, a width of the bridge structure in the first sub-transition display area A121, a width of the bridge structure in the second sub-transition display area A122, and a width of the bridge structure in the third sub-transition display area A123 gradually increase.

Please refer to FIG. 4. A width of each of the bridge structures 12 in the middle display area A1 is L1, a width of each of the third bridge structures 123 in the first sub-transition display area A121 is L2, and a width of each of the second bridge structures 122 in the second sub-transition display area A122 is L3, a width of the second bridge structure 122 formed by the second opening 14 in the third sub-transition display area A123 is also L3, and a width of each of the first bridge structures 121 in the third sub-transition display area A123 is L4, wherein L1<L2<L3<L4.

Further, a ratio of the width of the second bridge structure 122 to the width of the third bridge structure 123 is 1.2, and a ratio of the width of the first bridge structure 121 to the width of the second bridge structure 122 is also 1.2. The width of the bridge structure 12 located in the middle display area A11 is between 12 micrometers (μm)~18 μm. By limiting the width of the bridge structure 12 in each of the sub-transition display areas by the above ratio, the tensile strength of the bridge structure in the transition display area A12 can be improved, as well as ensuring that a size ratio of the bridge structure 12 in the middle display area A11 to the rigid island structure 11 is within a limited range, so that the middle display area A11 has better ductility, thereby ensuring that the stretchable display panel has a pixel density of not less than 141 PPI and a stretch rate of not less than 5%.

In practical applications, a ratio of the width of the second bridge structure 122 in the second sub-transition display area A122 to the width of the third bridge structure 123 in the first transition display area A121 may also be 1.3, 1.4, or 1.5. A ratio of the width of the first bridge structure 121 in the third sub-transition display area A123 to the width of the second bridge structure 122 in the second sub-transition display area A122 may also be 1.3, 1.4, or 1.5.

Specifically, in one embodiment of the present application, the width of the bridge structure 12 located in the middle display area is 15 μm, the width of the third bridge structure 123 in the first sub-transition display area A121 is 21 μm, the width of the second bridge structure 122 in the second sub-transition display area A122 is 30 μm, and the width of the first bridge structure 121 in the third sub-transition display area A123 is 40 μm.

Further, a ratio of the width of the first sub-transition display area A121 to the width of the second sub-transition display area A122 and the width of the third sub-transition display area A123 is 2:2:1. In the direction from the middle display area A11 to the wiring area A2, the tensile performance of the bridge structure 12 in each of the sub-transition display areas gradually weakens, and the tensile strength and rigidity gradually increase. The first sub-transition display area A121 and the second sub-transition display area A122 with strong tensile properties take up 40% of the entire transition display area A12, respectively, so as to bear most of the deformation in the transition display area A12. The third sub-transition display area A123, taking up 20% of an area of the transition display area A12, has greater tensile strength and rigidity and is configured to bear greater local stress. In this manner, the deformation in the transition display area A12 can be evenly distributed, and a stress concentration factor in this area can be reduced, thereby reducing risk of edge failure of the transition display area A12.

In one embodiment of the present application, please refer to FIGS. 3 and 4, the first opening 13 is an elongated opening and includes a first part 131 defined at both ends of the first opening 13 and a second part 132 interconnecting the first parts 131. Each of the first parts 131 is curved, and the second part 132 is straight. In practical applications, other designs of the first opening 13 can be used according to requirements, and are not limited to the above-mentioned elongated openings, and may also be cross-shaped, diamond-shaped, oval, or circular, etc.

Further, adjacent two of the first openings 13 are arranged in such a way that one of the two first openings 13 is provided in an extending direction perpendicular to the other one of the two first openings 13. In one embodiment of the present application, with reference to FIG. 4, a direction that the first opening 13 extends is a horizontal direction or a vertical direction. The directions that adjacent two of the first openings 13 are perpendicular to each other. In this manner, the first bridge structure 121 can be formed as a triangular bridge structure as shown in FIG. 4. Each of sides of the first bridge structure 121 is linear, so as to increase the tensile strength of the first bridge structure 121 and reduce the risk of breakage of the lines on the first bridge structure 121.

The transition display area A12 is a surrounding area defined by a plurality of sides connected end to end in turn. The transition display area A12 includes a middle region A124 located at a middle of each of the sides, and a corner region A125 located at where the sides are connected end to end, wherein the first openings 13 are at least defined in the middle region A124.

A plurality of the first openings 13 are arranged from the middle region A124 to the corner region A125. The first openings 13 in a unit area decrease in number and the second openings 14 in the unit area increase in number in a direction from the middle region A124 to the corner region A125. In some other embodiments, a plurality of first openings 13 may be provided only in the middle region A124.

Figure 5:
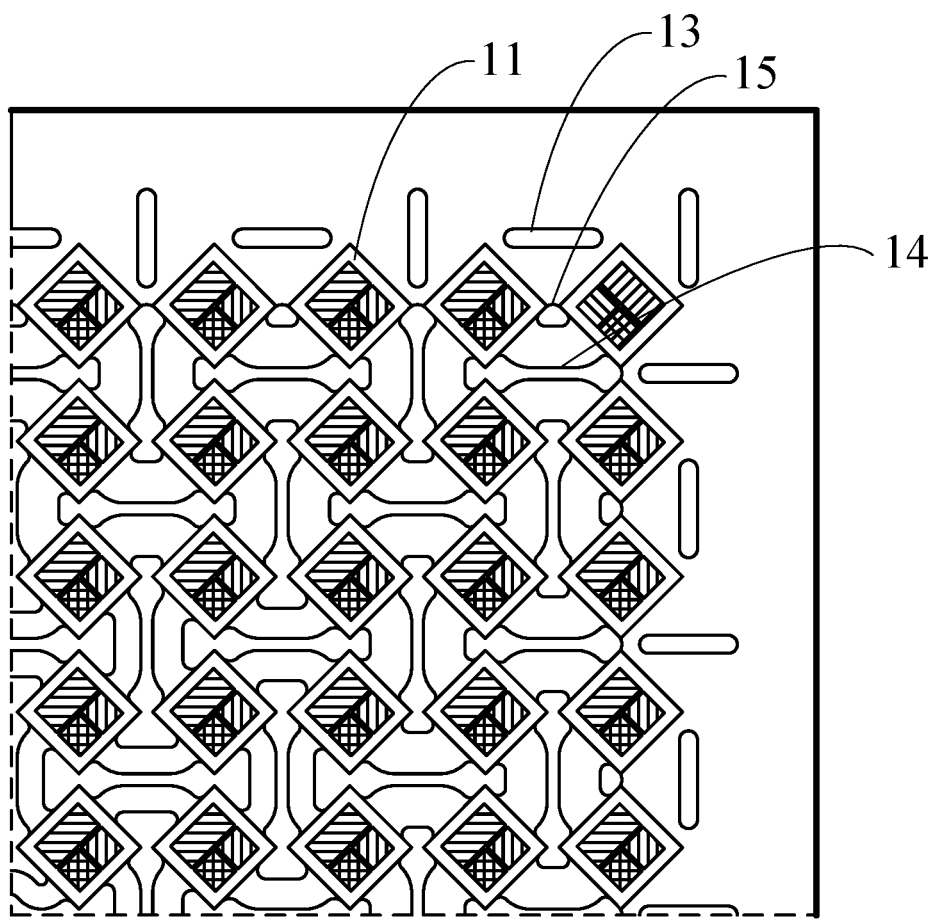
FIG. 5 is a schematic view showing a corner region provided by an embodiment of the present application.

Please refer to FIGS. 3 and 5. FIG. 5 is a schematic view showing a corner region provided by an embodiment of the present application. The part of the stretchable display panel shown in FIG. 3 is the middle region A124, and only one middle region and one corner region are used for illustration. Structures of other middle regions and corner regions are the same as a structure in FIGS. 3 and 5.

In FIG. 3, the first opening 13 is provided between any adjacent island structures 11 in a row of the three island structures 11 located close to the wiring area A2 in the third sub-transition display area A123 of the middle region A124. A plurality of the first openings 13 are also provided along a column of island structures 11 located at an outermost periphery close to the wiring area A2. A plurality of the second openings 14 are provided on a side of the third sub-transition display area A123 away from the middle display area A2. In FIG. 5, only a row of the island structures 11 and a column of the island structures 11 located at outermost sides in the third sub-transition display area A123 of the corner region A125 are provided with a plurality of the first openings 13, while other areas are provided with a plurality of the second openings 14. Local stress in the transition display area A12 is mainly concentrated in the middle region A124. Providing more first openings 13 in the middle region A124 can increase rigidity of this area and the tensile strength of the first bridge structure 121 located in this area, thereby reducing a stress concentration factor in this area. Providing less first openings 13 and more second openings 14 in the corner region A125 can ensure rigidity and tensile performance of the corner region A125.

It should be noted that FIGS. 3 and 5 only illustrate a distribution of the first openings 13 in the third sub-transition display area A123, and number of first openings 13 provided in FIGS. 3 and 5 does not represent number of the first openings 13 provided in practical applications. In practical applications, number of rows, columns, and numbers of the first opening 13 in the middle area A124, the corner area A125, and other areas can be set according to actual conditions, and is not limited here.

In one embodiment of the present application, with reference to FIGS. 3 and 5, the third sub-transition display area A123 is further provided with a plurality of third openings 15. The third openings 15 are provided between adjacent first openings 13 and the second openings 14, respectively. Each of the third openings 15 is a shaped opening which is substantially circular in shape. In FIG. 3, in the middle region A124, one of the third openings 15 is provided between the second opening 15 and the first opening 13 adjacent to and perpendicular to the second opening in an extending direction, wherein the third opening 15 has one end overlaps a phantom line connecting centers of adjacent two island structures 11 located at upper and lower sides of the third opening 15, and the third opening 15 has another end extends in a direction toward the second opening 14 and spaced at a spacing from the second opening 14. The spacing between the third opening 15 and the second opening 14 is formed as a bridge structure, wherein the bridge structure is symmetric to the second bridge structure 122 located at an opposite side of the adjoining second opening 14 with respect to the second opening 14.

In FIG. 5, in the corner region A125, a third opening 15 is also provided between the first opening 13 and the second opening 14 adjacent to each other and located in parallel with each other in an extending direction. One end of the third opening 15 also overlaps a phantom line connecting centers of adjacent two island structures 11 located at left and right sides, or at upper and lower sides of the third opening 15. The other end of the third opening 15 extends in a direction toward the second opening 14 and is spaced at a spacing from the second opening 14. The spacing between the third opening 15 and the second opening 14 is formed as a bridge structure, wherein the bridge structure is symmetric to the second bridge structure 122 located at an opposite side of the adjoining second opening 14 with respect to the second opening 14.

It can be understood that by providing the third openings 15 in an area transitioning from the second opening 14 to the first opening 13, and using the bridge structures, constructed by the third openings 15 and the second openings 14, that have a same structure as the second bridge structure 122, tensile performance of the area transitioning from the second opening 14 to the first opening 13 can be improved, and rigidity of the area can be adequately reduced, thereby alleviating the stress concentration in the area.

In one embodiment of the present application, a pixel unit is disposed above each of the island structures 11. The pixel unit includes a first sub-pixel, a second sub-pixel, and a third sub-pixel. The first sub-pixel is a green sub-pixel, the second sub-pixel is a blue sub-pixel, the third sub-pixel is a red sub-pixel, and these three sub-pixels are spaced apart from each other and arranged in parallel with a side of the island structure 11. In some other embodiments, each of the island structures 11 may also be provided with two or more pixel units. Arrangements of the pixel units and the sub-pixels in each of the pixel units can refer to arrangements of the prior art, and are not limited here.

In the embodiment of the present application, the lines on the bridge structure 12 include but are not limited to data lines, gate lines, power supply/voltage signal lines, etc. The boding area A3 may be formed without hollow configuration, and the signal lines in the display area A1 are collected in the bonding area A3 through the wiring area A2.

The stretchable display panel includes a flexible substrate 111 and a plurality of inorganic layers and organic layers stacked on the flexible substrate 111. The first openings 13 pass through the inorganic layers, the organic layers, and the flexible substrate 111.

Figure 6:
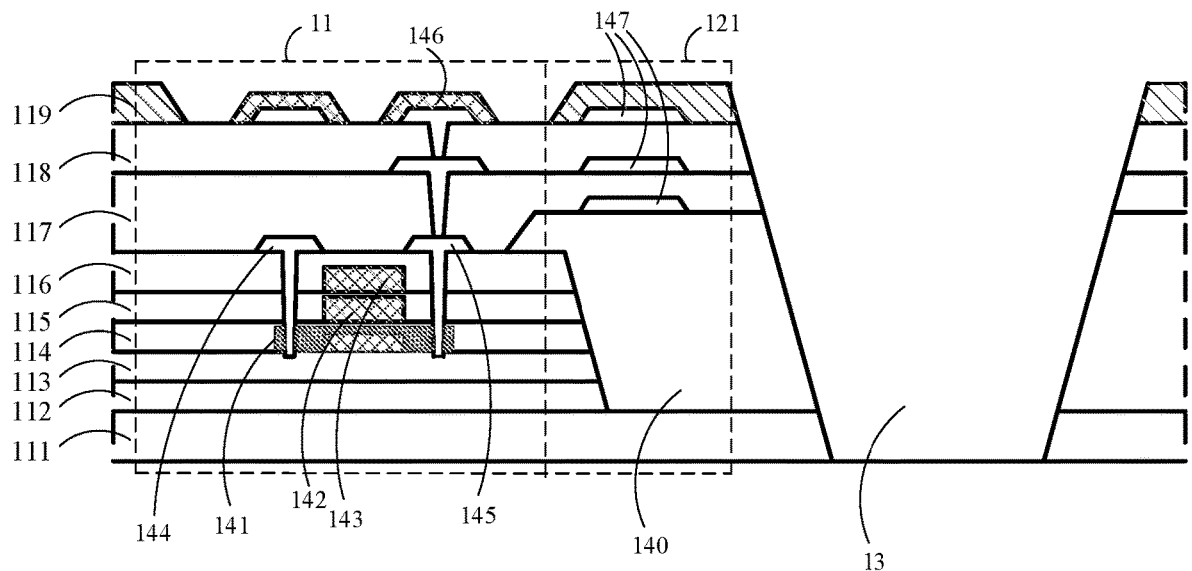
FIG. 6 is a schematic view of a laminated structure of film layers of a display panel provided by an embodiment of the present application.

In one embodiment of the present application, with reference to FIG. 6, which is a schematic view of a laminated structure of film layers of the display panel provided by an embodiment of the present application. An area where the island structure 11 is located includes a first barrier layer 112, a second barrier layer 113, a first gate insulating layer 114, a second gate insulating layer 115, an interlayer dielectric layer 116, a first planarization layer 117, a second planarization layer 118, and a third planarization layer 119 that are sequentially stacked on the flexible substrate 111. An active layer 141 of the thin-film transistor is formed on the first barrier layer 112, a first gate electrode 142 is formed on the first gate insulating layer 114, a second gate electrode 143 is formed on the second gate insulating layer 115, and a source electrode 144 and a drain electrode 145 are formed on the interlayer dielectric layer 116. A connecting substrate 146 included in the light-emitting diode is disposed on the second planarization layer 118 and is connected to the drain electrode 145 of the thin-film transistor through a via hole.

An area where the first bridge structure 121 is located includes an organic layer 140, the first planarization layer 117, the second planarization layer 118, and the third planarization layer 119 sequentially stacked on the flexible substrate 111. A plurality of lines 147 disposed above the first bridge structure 121 are formed on the organic layer 140, the first planarization layer 117, and the second planarization layer 118, respectively.

The first opening 13 sequentially passes through the third planarization layer 119, the second planarization layer 118, the first planarization layer 117, the organic layer 140, and the flexible substrate 111.

The first barrier layer 112, the second barrier layer 113, the first gate insulating layer 114, the second gate insulating layer 115, and the interlayer dielectric layer 116 are all made of inorganic materials. The inorganic materials may be silicon nitride or silicon oxide. In this manner, it not only block intrusion of water vapor and oxygen into the thin-film transistor, but also can make the island structure 11 have a certain degree of rigidity and tensile resistance, thereby preventing tensile stress from damaging the thin-film transistor and light-emitting diode on the island structure 11 during stretching.

The first planarization layer 117, the second planarization layer 118, and the third planarization layer 119 are all made of organic materials, which are used to encapsulate and protect traces in a laminated structure of the stretchable display panel, and reduce height difference resulting from a stacked arrangement of the layers made of the inorganic materials, as well as improving flatness of the overall stretchable display panel with the laminated structure.

The connecting substrate 146 of the light-emitting diode is a composite film layer formed by molybdenum and copper.

It should be noted that FIG. 6 only illustrates a film layer laminated structure of the third sub-transition display area A123. The film layer laminated structures of the island structures 11 and the bridge structures 12 in the other sub-transition display areas of the middle display area A11 and the transition display area A12 are same as the film layer laminated structures of the island structures 11 and the first bridge structures 121 in the third sub-transition display area A123, and are not reiterated here. The openings 10 provided in the middle display area A11 and the second openings 14 provided in each sub-transition display area also pass through the third planarization layer 119, the second planarization layer 118, the first planarization layer 117, the organic layer 140, and the flexible substrate 111.

By providing the flexible substrate 111, the organic layer 140 and each of the inorganic layers on the flexible substrate 111 with the above-mentioned hollow configuration, mechanical continuity of an entire film layer structure can be destroyed, thereby reducing its tensile modulus, so that the stretchable display panel becomes easier to stretch, and stretchable modulus of the display area A1 of the stretchable display panel can be controlled below 2 million pascals (MPa) which allows the stretchable display panel to have good stretch recovery and resilience, so the stretchable display panel can be returned to the original state after stretching.

The flexible substrate is made of polyimide, which can maintain good mechanical stability in an environment of 300° C. and has good corrosion resistance and weather resistance. In this way, it can be ensured that when the whole stretchable display panel is stretched by 5%, brightness of the display area remains basically unchanged, and the display panel can be returned to the original state.

Specifically, in one embodiment of the present application, a thickness of the flexible substrate is 6 µm. In practical applications, other film thickness can be used according to actual needs, not limited to the above 6 µm, and may also be 8 µm, 10 µm, 13 µm or 15 µm, etc.

In one embodiment of the present application, hollowed-out parts such as the openings 10, the first openings 13, and the second openings 14 can be filled with a viscoelastic material with stretchability such as optical glue, so as to improve flatness of a screen after the stretchable display panel is formed with the hollow configuration.

Figure 7:
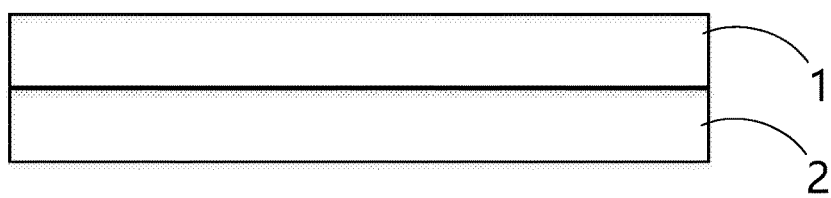
FIG. 7 is a schematic structural view of a display device provided by an embodiment of the present application.

An embodiment of the present application further provides a display device. Please refer to FIG. 7, which is a schematic structural view of a display device provided by an embodiment of the present application. The display device includes a device body 2 and a stretchable display panel 1 disposed on the device body 2. The device body 2 may include a housing component, a power supply component, a processor, a camera component, a microphone component, etc. The stretchable display panel 1 may be the stretchable display panel provided by the above-mentioned embodiments, and the stretchable display panel 1 in the display device provided by the embodiment of the present application can achieve the same technical effects as the stretchable display panel provided by the above-mentioned embodiments, which will not be repeated here. The display device may be a foldable mobile phone, a reel-type mobile phone, a foldable notebook computer, a smart watch, a vehicle-mounted display terminal, a flexible medical display terminal, etc.

Accordingly, embodiments of the present application provide a stretchable display panel and a display device. The stretchable display panel includes a display area and a wiring area surrounding the display area. The display area includes a middle display area and a transition display area defined between the middle display area and the wiring area. The stretchable display panel further includes a plurality of island structures and bridge structures arranged in an array in the display area. At least a pixel unit is disposed above each of the island structures, each of the bridge structures connects adjacent two of the island structures, and a plurality of lines are disposed above each of the bridge structures. Each of the bridge structures in the transition display area gradually increases in width in a direction from the middle display area to the wiring area. Since the tensile strength of the bridge structure is proportional to the width of the bridge structure, the tensile strength of the bridge structures in the transition display area gradually increase in the direction from the middle display area to the wiring area. In this manner, it not only ensures stretchability of the display area, but also increase tensile strength and tensile resistance of the transition display area, as well as improving uniformity of stress on each part of the transition display area. A plurality of first openings are defined on a side of the transition display area adjacent to the wiring area. Each of the first openings has opposite ends located within a boundary area defined by a connecting line connecting centers of adjacent two of the island structures corresponding to the opposite ends of the first opening. In this manner, the width of each of the bridge structures in the transition display area close to the wiring area is further increased, and a hollow ratio of this area is reduced, thereby further increasing local rigidity of the transition display area close to the wiring area and tensile strength of the bridge structure in the same area, so that a stress concentration factor of the above-mentioned area can be reduced, thereby lowering the risk of breakage of the lines in the transition display area close to the wiring area, solving a problem with conventional stretchable display panels that traces in edges of display areas are prone to breakage, and improving the tensile resistance and service life of the stretchable display panel.

In summary, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A stretchable display panel, comprising a display area and a wiring area surrounding the display area, and the display area comprising a middle display area and a transition display area defined between the middle display area and the wiring area, wherein the stretchable display panel further comprises:
   a plurality of island structures arranged in an array in the display area, and at least a pixel unit disposed above each of the island structures; and
   a plurality of bridge structures each connecting adjacent two of the island structures, and a plurality of lines disposed above each of the bridge structures;
   wherein each of the bridge structures in the transition display area gradually increases in width in a direction from the middle display area to the wiring area, and a plurality of first openings are defined on a side of the transition display area adjacent to the wiring area, wherein each of the first openings has opposite ends located within a boundary area defined by a connecting line connecting centers of adjacent two of the island structures corresponding to the opposite ends of the first opening,
   wherein a plurality of second openings are defined on the side of the transition display area adjacent to the middle display area, and each of the second openings has opposite ends extending beyond the boundary area defined by the connecting line connecting the centers of adjacent two of the island structures corresponding to the opposite ends of the second opening,
   wherein each of the first openings has an area smaller than an area of each of the second openings,
   wherein each of the second openings gradually decreases in area in the direction from the middle display area to the wiring area,
   wherein each of the second openings comprising a plane pattern having an axisymmetric shape of a symmetry axis, and a plurality of protrusions are configured on opposite two sides of the symmetry axis of the plane pattern and protrude outwardly in different directions from the symmetry axis, wherein the protrusions of each of the second openings gradually decrease in number in the direction from the middle display area to the wiring area.

2. The stretchable display panel of claim 1, wherein top portions of the protrusions located at two ends of each of the opposite two sides of the symmetry axis are spaced at a distance from the symmetry axis gradually decreasing in the direction from the middle display area to the wiring area.

3. The stretchable display panel of claim 1, wherein a ratio of a width of the transition display area to a width of the display area ranges from 3.9% to 4.8%.

4. The stretchable display panel of claim 1, wherein the transition display area comprises a first sub-transition display area, a second sub-transition display area, and a third sub-transition display area that sequentially surround the middle display area, and the first sub-transition display area, the second sub-transition display area, and the third sub-transition display area respectively comprise the bridge structures, wherein widths of the bridge structures in the first sub-transition display area, widths of the bridge structures in the second sub-transition display area, and widths of the bridge structures in the third sub-transition display area gradually increase.

5. The stretchable display panel of claim 4, wherein a ratio of a width of the first sub-transition display area to a width of the second sub-transition display area and a width of the third sub-transition display area is 2:2:1.

6. The stretchable display panel of claim 4, wherein a ratio of the widths of the bridge structures in the second sub-transition display area to the widths of the bridge structures in the first sub-transition display area is between 1.2 and 1.5, and a ratio of the widths of the bridge structures in the third sub-transition display area to the widths of the bridge structures in the second sub-transition display area is between 1.2 and 1.5.

7. The stretchable display panel of claim 1, wherein the first opening includes first parts defined at the ends of the first opening, and a second part interconnecting the first parts, wherein each of the first parts is curved, and the second part is straight.

8. The stretchable display panel of claim 7, wherein two of the first openings that are adjacent to each other are arranged in such a way that one of the two first openings is provided in an extending direction perpendicular to the other one of the two first openings.

9. The stretchable display panel of claim 1, wherein the transition display area is a surrounding area, and comprises a middle region located at a middle of each side of the stretchable display panel, and a corner region located at a junction of each side of the stretchable display panel, wherein the first openings are at least defined in the middle region.

10. The stretchable display panel of claim 9, wherein the first openings are arranged from the middle region to the corner region.

11. The stretchable display panel of claim 1, wherein a spacing between centers of any adjacent two of the island structures is the same.

12. The stretchable display panel of claim 1, wherein the stretchable display panel comprises a flexible substrate and a plurality of inorganic layers and organic layers stacked on the flexible substrate, and the first openings pass through the inorganic layers, the organic layers, and the flexible substrate.

13. A display device, comprising a stretchable display panel, and the stretchable display panel comprising a display area and a wiring area surrounding the display area, the display area comprising a middle display area and a transition display area defined between the middle display area and the wiring area, wherein the stretchable display panel further comprises:
a plurality of island structures arranged in an array in the display area, and at least a pixel unit disposed above each of the island structures; and
a plurality of bridge structures each connecting adjacent two of the island structures, and a plurality of lines disposed above each of the bridge structures;
wherein each of the bridge structures in the transition display area gradually increases in width in a direction from the middle display area to the wiring area, and a plurality of first openings are defined on a side of the transition display area adjacent to the wiring area, wherein each of the first openings has opposite ends located within a boundary area defined by a connecting line connecting centers of adjacent two of the island structures corresponding to the opposite ends of the first opening,
wherein a plurality of second openings are defined on the side of the transition display area adjacent to the middle display area, and each of the second openings has opposite ends extending beyond the boundary area defined by the connecting line connecting the centers of adjacent two of the island structures corresponding to the opposite ends of the second opening,
wherein each of the first openings has an area smaller than an area of each of the second openings,
wherein each of the second openings gradually decreases in area in the direction from the middle display area to the wiring area,
wherein each of the second openings comprising a plane pattern having an axisymmetric shape of a symmetry axis, and a plurality of protrusions are configured on opposite two sides of the symmetry axis of the plane pattern and protrude outwardly in different directions from the symmetry axis, wherein the protrusions of each of the second openings gradually decrease in number in the direction from the middle display area to the wiring area.

14. The display device of claim 13, wherein top portions of the protrusions located at two ends of each of the opposite two sides of the symmetry axis are spaced at a distance from the symmetry axis gradually decreasing in the direction from the middle display area to the wiring area.

15. The display device of claim 13, wherein a ratio of a width of the transition display area to a width of the display area ranges from 3.9% to 4.8%.

16. The display device of claim 13, wherein the transition display area comprises a first sub-transition display area, a second sub-transition display area, and a third sub-transition display area that sequentially surround the middle display area, and the first sub-transition display area, the second sub-transition display area, and the third sub-transition display area respectively comprise the bridge structures, wherein widths of the bridge structures in the first sub-transition display area, widths of the bridge structures in the second sub-transition display area, and widths of the bridge structures in the third sub-transition display area gradually increase.

17. The display device of claim 13, wherein the first opening includes first parts defined at the ends of the first opening, and a second part interconnecting the first parts, wherein each of the first parts is curved, and the second part is straight.

18. The display device of claim 13, wherein the transition display area is a surrounding area, and comprises a middle region located at a middle of each side of the stretchable display panel, and a corner region located at a junction of each side of the stretchable display panel, wherein the first openings are at least defined in the middle region.

19. The display device of claim 13, wherein a spacing between the centers of any adjacent two of the island structures is the same.

20. The display device of claim 13, wherein the stretchable display panel comprises a flexible substrate and a plurality of inorganic layers and organic layers stacked on the flexible substrate, and the first openings pass through the inorganic layers, the organic layers, and the flexible substrate.

* * * * *